United States Patent
Shao et al.

(10) Patent No.: US 12,304,864 B2
(45) Date of Patent: May 20, 2025

(54) EPOXY RESIN COMPOSITION FOR UNDERWATER GROUTING

(71) Applicant: SIKA TECHNOLOGY AG, Baar (CH)

(72) Inventors: Yan Shao, Guangzhou (CN); Weijie Yek, Guangzhou (CN); Lanwei Wang, Guangzhou (CN)

(73) Assignee: SIKA TECHNOLOGY AG, Baar (CH)

( * ) Notice: Subject to any disclaimer, the term of this patent is extended or adjusted under 35 U.S.C. 154(b) by 1235 days.

(21) Appl. No.: 16/982,416

(22) PCT Filed: Mar. 21, 2018

(86) PCT No.: PCT/CN2018/079873
§ 371 (c)(1),
(2) Date: Sep. 18, 2020

(87) PCT Pub. No.: WO2019/178775
PCT Pub. Date: Sep. 26, 2019

(65) Prior Publication Data
US 2021/0078903 A1    Mar. 18, 2021

(51) Int. Cl.
| | | |
|---|---|---|
| *C04B 24/28* | (2006.01) | |
| *C04B 14/06* | (2006.01) | |
| *C04B 24/12* | (2006.01) | |
| *C04B 24/26* | (2006.01) | |
| *C04B 28/04* | (2006.01) | |
| C04B 111/70 | (2006.01) | |
| C04B 111/74 | (2006.01) | |

(52) U.S. Cl.
CPC ............ *C04B 24/281* (2013.01); *C04B 14/06* (2013.01); *C04B 24/121* (2013.01); *C04B 24/2647* (2013.01); *C04B 28/04* (2013.01); C04B 2111/70 (2013.01); C04B 2111/74 (2013.01)

(58) Field of Classification Search
CPC . C04B 14/06; C04B 2103/10; C04B 2103/32; C04B 2111/70; C04B 2111/74; C04B 24/121; C04B 24/2647; C04B 24/281; C04B 26/14; C04B 28/04; C04B 40/065; C04B 7/02; C08L 63/10; C08L 63/00
See application file for complete search history.

(56) References Cited

U.S. PATENT DOCUMENTS

2015/0284563 A1* 10/2015 Beck .................. C08G 59/5026
523/400

FOREIGN PATENT DOCUMENTS

| | | |
|---|---|---|
| CN | 103819144 A | 5/2014 |
| CN | 105569101 A | 5/2016 |
| CN | 205205695 U | 5/2016 |
| CN | 105862574 A | 8/2016 |
| CN | 107151116 A | 9/2017 |
| CN | 107298958 A | 10/2017 |
| DE | 100 15 135 A1 | 10/2001 |
| EP | 1 138 697 A1 | 10/2001 |
| EP | 1 348 729 A1 | 10/2003 |
| EP | 1 138 697 B1 | 11/2003 |
| EP | 1 061 089 B1 | 3/2004 |
| EP | 3279230 A1 | 2/2018 |
| WO | 95/09821 A2 | 4/1995 |
| WO | 97/35814 A1 | 10/1997 |
| WO | 2005/090416 A1 | 9/2005 |

OTHER PUBLICATIONS

Dec. 25, 2018 Search Report issued in International Patent Application No. PCT/CN2018/079873.
Dec. 25, 2018 Written Opinion of the International Searching Authority issued in International Patent Application No. PCT/CN2018/079873.

* cited by examiner

*Primary Examiner* — Shuangyi Abu Ali
(74) *Attorney, Agent, or Firm* — Oliff PLC

(57) ABSTRACT

A curable epoxy resin compositions containing at least one epoxy resin having on average more than one epoxide group per molecule, at least one inorganic filler, at least one hydraulic binder, and at least one polycarboxylate ether, wherein the inorganic filler has silica with an amount of between 45 and 65 wt.-%, based on the total curable epoxy resin composition, and the amount of the polycarboxylate ether is between 0.01 and 0.03 wt.-%, based on the total curable epoxy resin composition. Further, a multi-component systems for producing the epoxy resin compositions, cured epoxy resins, and methods for repairing or reinforcing a pile or column.

14 Claims, No Drawings

EPOXY RESIN COMPOSITION FOR UNDERWATER GROUTING

TECHNICAL FIELD

The present invention relates to curable epoxy resin compositions for underwater grouting, containing at least one epoxy resin having on average more than one epoxide group per molecule, at least one inorganic filler, at least one hydraulic binder, and at least one polycarboxylate ether.

The present invention also relates to two-component systems for producing epoxy resin compositions, cured epoxy resin compositions, and methods for their application.

PRIOR ART

Epoxy resins are used for a variety of applications, for example as adhesives, coatings, sealants, or molding compositions for producing moldings. Among these, compositions comprising fillers and/or hydraulic binders are commonly used in grouting applications. Such filled composition show good mechanical properties as well as chemical, environmental, and mechanical resistance and have very good adhesive properties on substrates such as natural stone, concrete, and other construction surfaces.

One special field of application is the refurbishment or reinforcement of concrete foundations in water, of buildings such as piers or bridges, where concrete columns, piles, and other foundation elements are used to support platforms next to or on water bodies. Especially at the seaside, where strong elemental forces and high water movement are common, and the saline water itself has highly corrosive properties, these foundation structures often suffer from severe mechanical and chemical degradation and at some point require restorative work in order to maintain their ability to support the structures built thereon. Without any restoration, such affected foundation structures show concrete failure and steel bar exposure and they ultimately collapse.

One elegant and cost-efficient method for reinforcing underwater piles or columns involves the attachment of a glass-fiber sleeve around the damaged pile or column and the introduction of a grouting material between the damaged pile or column and the inner side of the glass-fiber sleeve. After curing, the grout forms a strongly adhering interlayer between pile or column and the sleeve and additionally fills cracks and holes, and the whole structure is significantly strengthened and protected against future abrasion. This method is known since the 1970s, and still is being optimized and further developed. For example, Chinese utility model CN 205205695 U or Chinese patent application CN 105862574 A teach this method in a recent approach.

However, this method requires a highly adapted grout that is also able to properly cure underwater, since the abrasion of the concrete piles or columns takes place also in partially or completely submerged sections. Many epoxy-based grouts are not able to meet the required properties and fail to cure and/or adhere properly on the substrates when in contact with water, in particular seawater.

Some special epoxy-based grouts have thus been developed that are generally suitable for this task. It was found that the use of $BaSO_4$ as filler in epoxy-based grouts leads to good underwater curing behavior, since it renders the compositions heavy by density increase and generally provides good flowability and low oil absorption in the material, which is advantageous. However, it is often observed that $BaSO_4$-filled compositions tend to disperse or separate when poured into water and the fillers are washed out over time, thereby reducing the overall performance of the cured grout.

Other commonly used fillers increase the viscosity of the compositions too much, which puts a serious burden on the workability of the compositions.

In general, it is a persistent problem in this field to balance flowability and dispersity of such epoxy-based grout compositions in water.

Overall, it would be desirable to provide an epoxy-based curable grout composition that is non-separable and fast curing under water, shows no shrinkage, has a low viscosity and good workability and an overall excellent performance regarding mechanical properties, chemical, mechanical, and fatigue resistance, as well as adhesion, in particular on wet or damp concrete.

THE OBJECT OF THE INVENTION

The object of the invention is to overcome the problems described above.

In particular, the invention shall provide a curable epoxy-resin composition with good flowability that shows excellent underwater handling and curing behavior and outstanding mechanical properties and adhesion, in particular underwater. Furthermore, it is an object of the present invention to provide a method for repairing or reinforcing a pile or column using the inventive curable epoxy resin composition, in particular a pile or column at least partially submerged in water.

DISCLOSURE OF THE INVENTION

Substance names beginning with "poly" designate substances which formally contain, per molecule, two or more of the functional groups occurring in their names. For instance, a polyamine refers to a compound having at least two amino groups. A polyether refers to a compound having at least two ether groups.

The term "polymer" in the present document encompasses on the one hand a collective of chemically uniform macromolecules which nevertheless differ in respect of degree of polymerization, molar mass, and chain length, which collective has been prepared through a polymerization reaction (chain growth addition polymerization, free radical polymerization, polyaddition, polycondensation). On the other hand the term also encompasses derivatives of such a collective of macromolecules from polymerization reactions, in other words compounds which have been obtained by reactions, such as additions or substitutions, for example, of functional groups on existing macromolecules and which may be chemically uniform or chemically non-uniform.

"Molecular weight" of oligomers or polymers is understood in the present document to be the molecular weight average $M_n$ (number average), which is typically determined by means of GPC.

The term "liquid" means herein that the described substance is a nearly incompressible fluid that conforms to the shape of its container but retains a (nearly) constant volume independent of pressure.

The unit term "wt.-%" means percentage by weight, based on the weight of the respective total composition, if not otherwise specified. The terms "weight" and "mass" are used interchangeably throughout this document.

All industrial norms and standard methods mentioned in this document are referring to the respective current versions at the time of filing, unless defined otherwise in a specific case.

The objects underlying the invention are achieved by epoxy resin compositions, multi-component systems, cured epoxy resins, and methods according to the claims.

The invention relates in a first aspect to a curable epoxy resin composition for underwater grouting, containing at least one epoxy resin having on average more than one epoxide group per molecule, at least one inorganic filler, at least one hydraulic binder, and at least one polycarboxylate ether, wherein said inorganic filler comprises silica with an amount of between 45 and 65 wt.-%, based on the total curable epoxy resin composition, and the amount of said polycarboxylate ether is between 0.01 and 0.03 wt.-%, based on the total curable epoxy resin composition.

Epoxy resin compositions include cross-linkable epoxy resins having more than one epoxide group per molecule. These react with suitable curing agents to form covalent bonds. According to the invention, the curable epoxy resin composition may already contain the curing agent or may not contain the curing agent. The epoxy resin composition according to the invention is curable, because the epoxide groups have not yet or have only partially reacted with the curing agent. Therefore, the composition is preferably liquid or pasty. Preferably, it has not yet solidified by partial curing to form a solid.

In a preferred embodiment, the epoxy resin composition is anhydrous. This means that it contains no water or possibly contains small amounts of water. The water content can be, for example, less than 0.5 wt. %, less than 0.1 wt. % or less than 0.05.% wt. %, based on the total weight of the composition. In a further embodiment of the invention, the epoxy resin composition contains an organic solvent that is liquid at room temperature (23° C.). The solvent may serve, for example, to adjust the viscosity or to promote or ensure the mixing of the components. The proportion of the organic solvent is preferably less than 10 wt.-% or less than 2 wt.-, based on the total weight of the composition. The proportion may be, for example, 0.01 to 50 wt.-%, 0.1 to 20 wt.-% or 0.2 to 2 wt.-%, based on the total weight of the composition.

In a preferred embodiment of the invention, the epoxy resin composition contains at least one curing agent. The epoxy resin composition may already be in the process of curing. Alternatively, the reaction does not yet begin even in the presence of the curing agent because the composition is not yet sufficiently activated. Such compositions typically contain a latent curing agent. The activation of epoxy resin composition having latent curing agents can be done by addition of catalysts or by increasing the temperature, for example to temperatures above 80° C. or above 150° C.

The epoxy resin composition according to the invention contains at least one epoxy resin. Epoxy resins are low molecular weight or polymeric compounds having epoxide groups. Suitable epoxy resins for producing plastic materials are known in the prior art and commercially available. If the epoxy resins have a defined, exact number of epoxide groups per molecule, they preferably have at least two epoxide groups per molecule, for example, two, three, four or more epoxide groups per molecule. If the epoxy resins are polymers having varying numbers of epoxide groups in the molecule, the epoxy resin must have on average more than one epoxide group per molecule in order to achieve overall crosslinking. The epoxy resin then preferably contains an average of at least two, at least three or at least four epoxide groups per molecule. According to the invention, mixtures of different epoxy resins can be used, for example, of two, three or more different epoxy resins.

The epoxy resin having on average more than one epoxide group per molecule is preferably a liquid epoxy resin. Such liquid resins contain freely movable polymer molecules not yet cross-linked. Preferably, it is not a polymer dispersion of already cured epoxy resin particles.

Epoxy resins are frequently ether compounds, in particular polyethers. In a preferred embodiment of the invention the epoxy resin is a glycidyl ether. It preferably has two, three, four or more glycidyl groups per molecule, or, preferably, on average at least two, three, four or more glycidyl groups per molecule. Preferred polymers are those having terminal glycidyl groups.

Epoxy resins are often condensates of glycidyl compounds and polyalcohols, in particular diols. Preferred are epoxy resins or condensates or polymers that were produced using bisphenols. Bisphenols are a group of chemical compounds bearing two hydroxyphenyl groups. The glycidyl compound epichlorohydrin is often used as a reactant.

Preferred epoxy resins have formula (I)

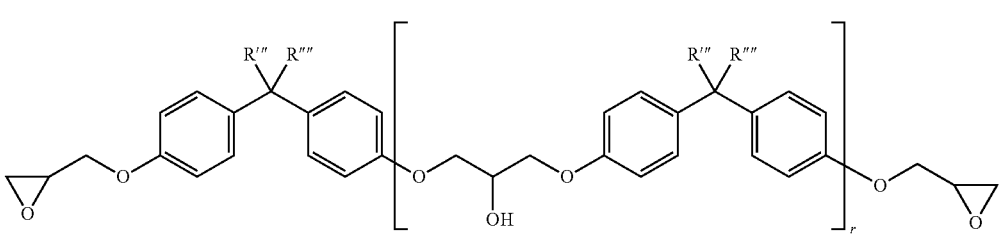

(I)

Here, the substituents R''' and R'''' independently of one another represent H or CH$_3$. Furthermore, the subscript r represents a value of 0 to 1. Preferably, r represents a value of less than 0.2.

Therefore preferably diglycidyl ethers of bisphenol A (DGEBA), of bisphenol F and of bisphenol A/F are used. The designation "A/F" here refers to acetone and formaldehyde, used among other things as reactants in the preparation. Such liquid resins are available, for example, as Araldite® GY250, Araldite® PY304, Araldite® GY282 (Huntsman) or D.E.R.™ 331 or D.E.R.™ 330 (Dow) or Epikote 828 or Epikote 862 (Hexion).

Also suitable as epoxy resin are so-called novolacs. They have in particular the following formula:

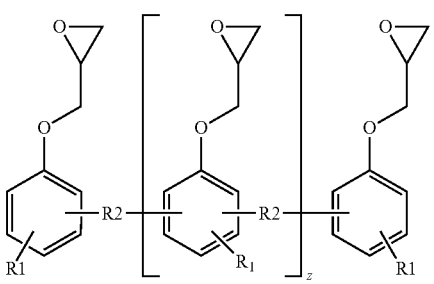

wherein

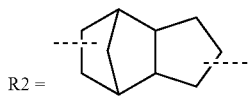

or CH$_2$, R1=H or methyl, and z=0 to 7.

In particular, these are phenol or cresol novolacs (R2=CH$_2$).

Such epoxy resins are commercially available under the trade name EPN or ECN and Tactix®556 from Huntsman or the product series D.E.N.™ from Dow Chemical.

The epoxy resin composition preferably further contains at least one reactive diluent. Epoxy resin reactive diluents serve to control the reaction. They may be low-viscosity, aliphatic or cycloaliphatic epoxy compounds such as glycidyl ethers. The reactive diluents are preferably monofunctional glycidyl ethers such as C12-C14 monoglycidyl ether, difunctional glycidyl ethers such as butanediol diglycidyl ether or hexanediol diglycidyl ether, trifunctional glycidyl ethers such as trimethylolpropane triglycidyl ether, aliphatic polyols having one, two, three or more functional glycidyl ether groups. Also suitable are epoxidized soybean oil or linseed oil, acetoacetate-containing compounds, in particular acetoacetylated polyols, butyrolactone, and further isocyanates and reactive group-containing silicones.

The composition according to the invention preferably contains at least one curing agent for epoxy resins. Common and known compounds which react with the epoxide groups may be used as the curing agent. Thereby, the epoxy resin is cross-linked. Curing agents are preferably basic curing agents, in particular amine compounds or amides. Preferably, the curing agents contain at least two primary or secondary amino groups per molecule. Amine compounds having two or more amino groups per molecule are hereinafter referred to as "polyamines." If the polyamines are polymers, they contain on average at least two amino groups per molecule. According to the invention, mixtures of different curing agents may be used, for example, of two, three or more different curing agents.

In a preferred embodiment of the invention the curing agent contains at least one polyamine, which is preferably selected from the group consisting of aliphatic, cycloaliphatic or arylaliphatic primary diamines, triamines and tetramines, polyamines with more than four amine groups per molecule, secondary amino group-containing polyamines, amine/polyepoxide adducts, poly(ethylene imines), polyamidoamines, polyetheramines and amino group-terminated butadiene/acrylonitrilecopolymers.

Polyamines are also polyoxyalkylene diamines with molecular weight below 500 g/mol (Jeffamine® D-230, Jeffamine D400, Jeffamine® EDR-148), 4,7,10-trioxatridecane-1-13-diamine, 4,9-dioxadodecane-1,12-diamine, ethylene diamine and/or 3(4),8(9)-bis-(aminomethyl)-tricyclo [5.2.1.0$^{2,6}$]decane (TCD Diamine®, manufactured by Celanese Chemicals).

Other polyamines that are suitable as curing agents are, for example:

Aliphatic, cycloaliphatic or arylaliphatic primary diamines, for example, ethylenediamine, 1,2-propanediamine, 1,3-propanediamine, 2-methyl-1,2-propanediamine, 2,2-dimethyl-1,3-propanediamine, 1,3-butanediamine, 1,4-butanediamine, 1,3-pentanediamine (DAMP), 1,5-pentanediamine, 1,5-diamino-2-methylpentane (MPMD), 2-butyl-2-ethyl-1,5-pentanediamine (C11-neodiamine), 1,6-hexanediamine, 2,5-dimethyl-1,6-hexanediamine, 2,2,4- and 2,4,4-trimethylhexamethylenediannin (TMD), 1,7-heptanediamine, 1,8-octanediamine, 1,9-nonanediamine, 1,10-decanediamine, 1,11-undecanediamine, 1,12-dodecanediamine, 1,2-, 1,3- and 1,4-diaminocyclohexane, bis-(4-aminocyclohexyl)-methane(H$_{12}$-MDA), bis-(4-amino-3-methylcyclohexyl)-methane, bis-(4-amino-3-ethylcyclohexyl)-methane, bis-(4-amino-3,5-dinnethylcyclohexyl)-methane, bis-(4-amino-3-ethyl-5-methylcyclohexyl)-methane (M-MECA), 1-amino-3-aminomethyl-3,5,5-trimethylcyclohexane (=isophorone diamine or IPDA), 2- and 4-methyl-1,3-diaminocyclohexane and mixtures thereof, 1,3- and 1,4-bis-(aminomethyl)-cyclohexane, 1,3-cyclohexylenebis-(methylamine), 2,5(2,6)-bis-(aminomethyl)-bicyclo[2.2.1]heptane (NBDA), 3(4),8 (9)-bis-(aminomethyl)-tricyclo[5.2.1.0$^{2,6}$]decane, 1,4-diamino-2,2,6-trimethylcyclohexane (TMCDA), 1,8-menthane diamine, 3,9-bis-(3-aminopropyl)-2,4,8,10-tetraoxaspiro[5.5]undecane as well as 1,3- and 1,4-xylylenediamine;

Ether group-containing aliphatic primary diamines; for example bis-(2-aminoethyl)-ether, 3,6-dioxaoctane-1 8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine and higher oligomers of these diamines, bis-(3-aminopropyl)-polytetrahydrofurans and other polytetrahydrofuran diamines with molecular weights in the range of, for example, 350 to 2000 and polyoxyalkylene diamines. The latter are typically products from the amination of polyoxyalkylene diols and are for example available under the name Jeffamine® (Huntsman), under the name polyether amine (from BASF) or under the name PC Amines® (from Nitroil). Particularly suitable polyoxyalkylene diamines are Jeffamine® D-230, Jeffamine® D-400, Jeffamine® D-2000, Jeffamine® XTJ-511, Jeffamine® ED-600, Jeffamine® ED-900, Jeffamine® ED-2003, Jeffamine® XTJ-568, Jeffamine® XTJ-569, Jeffamine® XTJ-523, Jeffamine® XTJ-536, Jeffamine® XTJ-542, Jeffamine® XTJ-559, Jeffamine® EDR-104, Jeffamine® EDR-148, Jeffamine® EDR-176; polyether amine D 230, polyether amine D 400 and polyether amine D 2000, PC Amine® DA 250, PC Amine® DA 400, PC Amine® DA 650 and PC Amine® DA 2000;

secondary amino group-containing polyamines; for example, diethylenetriamine (DETA), N,N-bis-(2-aminoethyl)-ethylenediamine, dipropylenetriamine (DPTA), bis-hexamethylenetriamine (BHMT), 3-(2-aminoethyl)-aminopropylamine, triethylenetetramine, tetraethylenepentamine, N3-(3-aminopentyl)-1,3-pentanediamine, N5-(3-aminopropyl)-2-methyl-1,5-pentanediamine, N5-(3-amino-1-ethylpropyl)-2-methyl-1, 5-pentanediamine, N,N'-dibutylethylenediamine; N,N'-di-tert-butylethylenediamine, N,N'-diethyl-1,6-hexanediamine, 1-(1-methylethylamino)-3-(1-methylethyl-aminomethyl)-3,5,5-trimethylcyclohexane (Jefflink® 754 from Huntsman), N4-cyclohexyl-2-methyl-N2-(2-methylpropyl)-2,4-pentanediamine, N,N'-dialkyl-1,3-xylylenediamine, bis-(4-(N-alkylamino)-cyclohexyl)-methane, 4,4'-trimethylene dipiperidine, N-alkylated polyetheramines, for example, Jeffamine® types SD-231, SD-401, SD-404 and SD-2001 (from Huntsman);

amine/polyepoxide adducts; particularly adducts of the aforementioned polyamines with diepoxides in a molar ratio of at least 2/1, in particular in the molar ratio of 2/1 to 10/1;

polyamidoamines, which are reaction products of a mono- or polybasic carboxylic acid or esters or anhydrides thereof, in particular reaction products of a dimer fatty acid and an aliphatic, cycloaliphatic or aromatic polyamine used in a stoichiometric excess, in particular a polyalkylene amine such as DETA or triethylenetetramine (TETA), in particular the commercially available polyamidoamines Versamid® 100, 125, 140 and 150 (from Cognis), Aradur® 125, 140, 223, 250 and 848 (from Huntsman), Euretek® 3607, Euretek® 530 (from Huntsman), Beckopox® EH 651, EH 654, EH 655, EH 661 and EH 663 (from Cytec);

polyethyleneimines (PEI), which are branched polymeric amines from the polymerization of ethyleneimine. A suitable polyethyleneimine typically has an average molecular weight in the range of 250 to 25,000 g/mol and contains tertiary, secondary and primary amino groups. Polyethyleneimines are available, for example, under the trade name Lupasol® (from BASF), for example Lupasol® WF, Lupasol® FG, Lupasol® G20 and Lupasol® PR 8515.

Mannich bases; namely amines with further functional groups, which are obtainable by the Mannich reaction in which an aminoalkylation of CH-acidic compounds with an aldehyde and ammonia, or a primary or secondary amine takes place.

Acidic curing agents can also be used as the curing agents, in particular acid anhydrides. Catalytically active curing agents such as fluorides can also be used, for example, boron trifluoride.

The composition according to the invention contains at least one hydraulic binder. Herein the expression "hydraulic binder" is understood to mean a, in most cases pulverulent, material which, mixed with water, forms a paste which sets and hardens by a series of hydration reactions and processes and which, after hardening, retains its strength and its stability even underwater.

A hydraulic binder or hydraulic binding agent is thus a substantially inorganic or mineral material or blend, which hardens when mixed with water. Hydraulic binders also encompass latent hydraulic binders or pozzolanic binders which usually require activation, e.g. by the presence of lime, in order to show hydraulic properties. All hydraulic binders known to those skilled in the art are suitable.

Typical examples of suitable hydraulic binders are cement, e.g. Portland cement, white cement, calcium aluminate, also known as aluminate cement, calcium sulfoaluminate, calcium sulfate (gypsum), fly ash, granulated blast furnace slag, lime, such as limestone and quicklime, rice husk, calcined paper sludge, and pozzolana, or a mixture thereof. A preferred hydraulic binder is cement, in particular Portland cement.

The term "Portland cement" as used herein is intended to include those cements normally understood in the art to be "Portland cement" such as those described in British Standards Institution (BSI) EN-197 and American ASTM Standard C-150 and European Standard EN-197. The types CEM I and CEM II compositions of the latter standard are preferred for use in the present invention, although other forms of Portland cement are also suitable. Portland cement consists mainly of tri-calcium silicate and dicalcium silicate.

The amount of hydraulic binder in the composition according to the present invention is preferably between 5 and 10 wt.-%, based on the total composition. Preferably, the hydraulic binder used in this embodiment is cement, in particular Portland cement.

The epoxy resin composition according to the invention contains at least one inorganic filler. These inorganic fillers are preferably mineral fillers. Inorganic fillers may be of natural origin or produced artificially. Suitable fillers are known in the prior art and commercially available. They are used in particular to increase the stability of the epoxy resin and to reduce costs in the formulation. They may also perform other functions, for example, as pigments for coloring, to control the rheology or as fire or oxidation retardants or stabilizers. The fillers can be synthetic fillers or naturally occurring minerals. They are preferably oxygen-containing compounds. Usually, oxides, mixed oxides or salts of metals and semi-metals, in particular silicon, are used. The fillers can also be metallic such as aluminum, in particular in the form of aluminum powder. In a preferred embodiment, the fillers are not metals.

The inorganic fillers are preferably selected from silicon compounds such as silica, silicates and precipitated and fumed silicas; metal oxides such as titanium dioxide, iron oxide, alumina, zinc oxide and magnesium oxide; metal carbonates such as calcium carbonate or dolomite; metal sulfates such as barium sulfate; metal hydroxides such as aluminum hydroxide, nitrides or carbides, clay minerals such as kaolin, glass and ceramic materials.

The silica may be for example quartz, e.g., in the form of quartz powder or quartz sand. The silicate may be, for example, talc, mica or wollastonite. The sulfate may be, for example barite (heavy spar, barium sulfate). Mixtures of different fillers and/or different fractions of a filler having different sizes may be used also. The fillers may have customary forms. In particular, powders can be used, as well as hollow spheres (for example made of glass or ceramic) or fibers.

The fillers may be coated or surface-treated.

The filler in the epoxy resin composition according to the invention comprises silica with an amount of between 45 and 65 wt.-%, based on the total epoxy resin composition. In some preferred embodiments, only silica is used as filler in the composition. However, other fillers as mentioned above may be used in addition to the silica filler. Only with silica in this wt.-% range, the properties for an excellent underwater grout can be achieved.

The size of the fillers and the particle size distribution are selected in view of the desired properties of the epoxy resin composition and of the cured epoxy resin. The fillers used according to the invention may therefore be of any particle size, for example from 1 µm to 1 cm, in particular between 10 µm and 6 mm. The average particle size of the fillers, for example, may be between 10 µm and 3 mm. The particle size and particle size distribution of fillers can be determined by sieve analysis or by microscopic examination. In a particularly preferred embodiment, the inorganic fillers are finely divided fillers, or the fillers have a proportion of finely divided fillers, which is preferably added during production as a finely divided filler fraction. Finely divided fillers are in particular fillers with absolute particle sizes less than 60 μm, preferably less than 50 μm. Finely divided fillers are in particular fillers having an average particle size of less than 50 μm, less than 30 μm or less than 10 μm. Here, the particle size of the finely divided fillers can be at least 0.5 μm, at least 1 μm or at least 2 μm. Preferably, the finely divided fillers have particle sizes from 0.5 to 60 μm, in particular between 1-30 μm. In a preferred embodiment of the invention a mixture of different fillers and/or fractions of the same filler are/is used, which have different particle sizes. For example, a mixture of finely divided fillers with absolute particle sizes less than 60 μm and coarser fillers with absolute particle sizes of 60 μm to 1 cm can be used.

In a preferred embodiment of the invention, the inorganic fillers comprise a proportion of finely divided fillers, which is at least 5 wt. %, preferably at least 10 wt. %, at least 50 wt. %, at least 80 wt. % or at least 95 wt. %, based on the total weight of all inorganic fillers. Here, the epoxy resin composition may also contain only finely divided fillers as the fillers.

In especially preferred embodiments of the invention, said silica used as filler has a particle size of <50 μm, determined by sieve analysis according to ASTM E11 using a No. 325 Mesh. Preferably, the particle size D50 is 10-30 μm.

The epoxy resin composition according to the invention contains at least one polycarboxylate ether. Suitable polycarboxylate ethers are used in the prior art as dispersing agents for hydraulically setting compositions, in particular gypsum and cement. Polycarboxylate ethers are comb polymers with a main chain having carboxy groups, and side chains having ether groups, inter alia. The polycarboxylate ethers usually have side chains with polyether groups, in particular based on polyethylene glycol and/or polypropylene glycol. According to the invention, the term "polycarboxylate ether" refers to compounds which have ether groups, wherein they may have other groups, in particular ester and amide groups. In the prior art, the polycarboxylate ethers according to the invention are therefore also referred to as "polycarboxylate esters". According to the invention, mixtures of different polycarboxylate ethers can be used.

The polycarboxylate ethers are comb-polymers comprising a backbone to which anionic groups and/or their salts and polyalkylene glycol chains are connected, wherein the anionic groups are selected from the group consisting of carboxylic acid, sulfonic acid, sulfate, phosphonic acid and phosphate. The polyalkylene glycol chains are preferrably bound vie ester, ether, imide and/or amid groups to the polymer backbone. Preferred dispersing agents are polycarboxylic ethers (PCE) which are comb polymers, containing carboxylic acid groups or their salts and polyalkylene glycol chains.

Suitable polycarboxylate ethers are commercially available, for example, from Sika AG, CH, under the brand name Sika Visocrete.

Preferably, the polycarboxylate ether has side chains which are attached to a main chain via ester, amide and/or ether groups. The main chain has at least one acid moiety or a salt thereof, which is preferably an acrylic acid moiety and/or a methacrylic acid moiety. The polycarboxylate ether is preferably produced by esterification and/or amidation of a polycarboxylic acid or a salt or anhydride thereof.

An acid moiety is usually introduced into the polymer by performing the polymerization in the presence of a corresponding acid monomer, which is usually unsaturated, or a salt or anhydride thereof. Suitable acid monomers are in particular α-unsaturated mono- or dicarboxylic acids, in particular, acrylic acid, methacrylic acid, maleic anhydride, maleic acid, itaconic acid, crotonic acid or fumaric acid.

The at least one acid moiety, in particular the at least one acrylic acid moiety and/or the at least one methacrylic acid moiety may be partially or completely neutralized. The acid moiety may be present as free acid or as a salt or partial salt or anhydride, where the term "salt" here and below, in addition to the classical salts such as are obtained by neutralization with a base, also comprises complex-chemical compounds between metal ions and the carboxylate or carboxyl groups as ligands. The classical salts are obtained in particular by neutralization with sodium hydroxide, calcium hydroxide, magnesium hydroxide, ammonium hydroxide or an amine.

Preferably, the polycarboxylate ether polymer is a comb polymer comprising structural units (i) of the formula and structural units (ii) of the formula Ill,

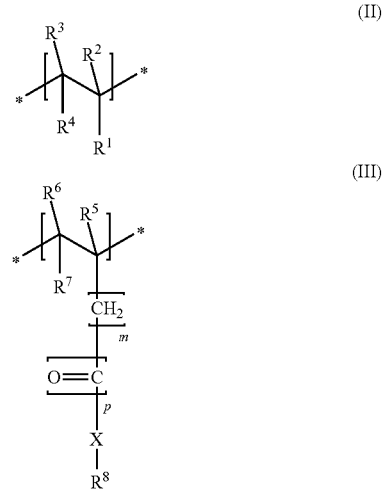

wherein
$R^1$, independently of one another, represents —COOM, —SO$_2$—OM, —O—PO(OM)$_2$, and/or —PO(OM)$_2$,
$R^2$ and $R^5$, independently of one another, represent H, —CH$_2$COOM, or an alkyl radical with 1 to 5 carbon atoms,
$R^3$ and $R^6$, independently of one another, represent H or an alkyl radical with 1 to 5 carbon atoms,
$R^4$ and $R^7$, independently of one another, represent H, —COOM, or an alkyl radical with 1 to 5 carbon atoms, or wherein $R^1$ together with $R^4$ forms a —CO—O—CO— ring (anhydride),
M, independently of one another, represents H$^+$, an alkali metal ion, an alkaline earth metal ion, an ammonium cation, an organic ammonium compound, a di- or trivalent metal cation, or mixtures thereof;
m=0, 1, or 2,
p=0 or 1,
X, independently of one another, represents —O—, NH—, or —NR$^8$—,
$R^8$, independently of one another, represents a radical of the formula
-[AO]$_n$—R$^a$,
wherein A=C$_2$- to C$_4$-alkylene, R$^a$ represents H, a C$_1$- to C$_{20}$-alkyl group, -cyclohexyl group, or -alkylaryl group,
and n=2 to 250, in particular 10 to 200.

Preferred are comb polymers comprising structural units (i) of the formula II and structural units (ii) of the formula II, wherein
$R^1$ represents —COOM,
$R^2$ and R, independently of one another, represent H or $CH_3$,
$R^3$, $R^6$ and $R^7$ represent H,
$R^4$, independently of one another, represents H or —COOM,
M, independently of one another, represents $H^+$, an alkali metal ion, or an alkaline earth metal ion;
m=0, 1 or 2,
p=0 or 1,
X, independently of one another, represents —O— or —NH—,
$R^8$ represents a group of formula -$[AO]_n$—$R^a$
wherein A=$C_2$- to $C_3$-alkylene, in particular $C_2$-alkylene, $R^a$ represents H or a $C_1$- to $C_4$-alkyl group, and
n=10 to 200, preferably 15 to 150, in particular 22 to 120.

Particularly preferred are comb polymers comprising structural units (i) of the formula and structural units (ii) of the formula III, wherein
$R^1$ represents —COOM,
$R^2$, $R^4$, R, $R^3$, $R^6$ and $R^7$ represent H,
M, independently of one another, represents $H^+$, an alkali metal ion, or an alkaline earth metal ion;
m=0,
p=1,
X represents —O—,
$R^8$ represents a group of formula -$[AO]_n$—$R^a$
wherein A=$C_2$-alkylene, $R^a$ represents $CH_3$, and n=22 to 72.

Particularly advantageous are comb polymers in which structural unit (i) is derived from acrylic acid or methacrylic acid, and in which the structural unit (ii) is derived from a polyalkylene glycol (meth)acrylate or an alkenyl-polyalkylene glycol ether having 2 to 5 C atoms in the alkenyl group and the polyalkylene glycol has 10 to 150, preferably 22 to 120, alkylene glycol units.

Preferably, the polyalkylene glycol is a polyethylene glycol.

The comb polymer preferably consists exclusively of structural units (i) and (ii).

However, it may also be advantageous if the comb polymer contains further structural units (iii). Advantageous further structural units are preferably derived from methacrylic acid esters, hydroxyalkyl methacrylate, N-vinylpyrrolidone or vinyl esters.

Preferred is the molar ratio of structural unit (i) to structural unit (ii) and structural unit (iii) (1-10):1:(0-3). Most preferred is the molar ratio of structural unit (i) to structural unit (ii) and structural unit (iii) (5-6):1:0.

Preferably, the comb polymer has an average molecular weight $M_w$ of 8,000 to 100,000, more preferably 9,000 to 80,000 g/mol.

The molecular weight, such as the weight average molecular weight $M_w$ or the number average molecular weight $M_n$, is determined by gel permeation chromatography (GPC) with polyethylene glycol as a standard. The eluent used is a 0.1N $NaNO_3$ solution whose pH was adjusted to 12 with NaOH.

This technique is known per se to the person skilled in the art.

Suitable preparation methods for the comb polymers are a free radical copolymerization of the corresponding monomers or a polymer-analogous esterification or amidation of polymers which comprise carboxyl groups with polyalkylene glycols or polyalkylene glycol amines endcapped on one side with an alkyl or aryl group.

The polycarboxylate ethers may be produced by the polymer-analogous reaction. The polymer-analogous reaction has the advantage that by varying the amount, type and ratio of alcohols and amines, polycarboxylate ethers with very different and advantageous structures and properties can be obtained from polycarboxylic acids. It has surprisingly been found that by the use according to the invention of polycarboxylate ethers which have been produced by polymer-analogous reaction, particularly advantageous properties are achieved, wherein in particular the workability of cement compositions is ensured over long periods of time. The different properties are likely to be obtained by different distributions of the side chains in the polymer.

Polymer-analogous reactions are known per se and are described, for example, in WO97/35814A1, WO95/09821A2, DE 100 15 135 A1, EP 1138697 A1, EP 1348729 A1, and WO2005/090416 A1. Details about the polymer-analogous reaction are disclosed, for example, in EP 1 138 697 B1 on page 7, line 20 to page 8, line 50, and in the examples included, or in EP 1 061 089 B1 on page 4, line 54 to page 5, line 38 and in the examples.

The polycarboxylate ether polymer used according to the invention may be produced also by a free radical polymerization reaction, wherein the copolymer is obtained from corresponding ethylenically unsaturated acid, ester and amide monomers in the presence of a free radical generator. The route via free radical polymerization is the method most commonly used in the prior art.

Depending on the reaction conditions, the polycarboxylate ether may be used as a reaction product, which, in addition to the polycarboxylate ether, contains free compounds of the starting materials, in particular free monohydroxy compounds such as unilaterally end group-capped polyoxyalkylene, in particular free methoxy-polyoxyethylene.

However, advantageous comb polymers can also be prepared via "living radical polymerization" of suitable monomers. Especially advantageous are comb polymers with block or gradient structure.

Advantageously, the copolymer is in a solid state, in particular in the form of a powder. Solutions or dispersions of the copolymers may e.g. be converted by spray drying into the solid state. Polymer melts can advantageously be converted by grinding into a powder after solidification.

Advantageously, the polymer powder may also contain stabilizers and/or inert carrier material.

The amount of polycarboxylate ether is between 0.01 and 0.03 wt.-%, based on the total epoxy resin composition. Below this range, the composition is too difficult to handle due to increased viscosity and cannot be applied properly in underwater grouting applications. With higher amounts of polycarboxylate ether, the flowability becomes better. However, when the above range is exceeded, the underwater stability of the freshly applied composition becomes compromised. With an amount of polycarboxylate ether too high, filler particles are prone to be washed out and the composition partially disperses in water. Thus, only within the above range optimal results are achieved.

In a preferred embodiment of the invention, the epoxy resin composition according to the invention is provided as a multi-component system. Curable epoxy resin compositions are regularly provided to the user as multi-component systems. In this case, the epoxy resin and the curing agent are regularly contained in different components, so that the curing reaction can take place only when the user mixes the components. The filler, haydraulic binder, and polycarboxylate ether may be part of one or both of these components or part of an extra (filler) component.

The invention also relates to a multi-component system for producing a curable epoxy resin composition, comprising a component K1 containing said at least one epoxy resin, and a curing agent component K2 containing at least one curing agent, wherein said inorganic filler, said hydraulic binder, and said polycarboxylate ether are contained in said component K1, said component K2, or in an additional component K3.

A preferred embodiment of that multi-component system is a two-component system, comprising a component K1 containing said at least one epoxy resin, and a curing agent component K2 containing at least one curing agent, wherein said inorganic filler, said hydraulic binder, and said polycarboxylate ether are contained in said component K1.

In a preferred embodiment of that two-component system, said component K1 comprises
- between 15 and 35 wt.-%, based on the total component K1, of said epoxy resin;
- between 0 and 5 wt.-%, based on the total component K1, of an epoxy-functional diluent;
- between 0 and 0.1 wt.-%, based on the total component K1, of a defoamer;
- between 5 and 10 wt.-%, based on the total component K1, of said hydraulic binder;
- between 50 and 70 wt.-%, based on the total component K1, of said inorganic filler;
- between 0.015 and 0.025 wt.-%, based on the total component K1, of said polycarboxylate ether;

and said component K2 comprises
- between 20 and 60 wt.-%, based on the total component K2, of at least one polyamine;
- between 0 and 15 wt.-%, based on the total component K2, of an accelerator;
- between 0 and 50 wt.-%, based on the total component K2, of solvents;

Wherein all amounts of the individual ingredients in each component K1 and K2 are adjusted such that sum of all individual amounts does not exceed 100% in the respective component K1 or K2.

When a curing agent is contained in said component K1, it is preferably a latent curing agent. Latent curing agents only take effect after they are activated, in particular by catalysts or elevated temperature. When a latent curing agent is contained in component K1, then a catalyst may be used for the activation of the curing agent in component K2. If a non-latent curing agent is used, it is not contained in component K1, but rather in a separate component, preferably a curing agent component K2.

The inorganic filler, the hydraulic binder, and the polycarboxylate ether are preferably contained in the same component K3, K2 or K1.

Preferably, the multi-component system is a two- or three-component system. According to the invention it has been found that such a multi-component system with at least two components ensures a particularly good durability of the individual components over extended periods of time.

The epoxy resin composition according to the invention and the multi-component system may contain other conventional additives. A plurality of additives is well-known in the technical field of epoxy resins that influence the properties of the curable compositions or the cured epoxy resins. The proportion of additives in the epoxy resin composition which is contained in addition to epoxy resins, curing agents, polycarboxylate ethers, hydraulic binders, and inorganic fillers, can be—including solvent—for example, up to 50 wt. %, up to 20 wt. %, up to 5 wt. %, or up to 2 wt. %.

In a preferred embodiment of the invention, at least one further additive selected from reactive diluents, plasticizers, solvents, film-forming agents, extenders, catalysts, accelerators, polymers, rheology modifiers, adhesive promoters, stabilizers, defoamers, deaerating agents, flame retardants, surfactants, biocides, organic dyes and pigments and other dispersing agents is contained. These include, for example:

Solvents, film-forming agents or extenders such as aromatic solvents such as toluene, xylene or benzyl alcohol, methyl ethyl ketone, 2-ethoxyethanol, 2-ethoxyethyl acetate, aliphatic alcohols such as ethanol, propanol or butanol, benzyl alcohol, phenols such as nonylphenol or nonylphenol ethoxylates, ethers or polyethers such as ethylene glycol, diethylene glycol butyl ether, dipropylene glycol butyl ether, ethylene glycol butyl ether, ethylene glycol phenyl ether, N-methylpyrrolidone, propylene glycol butyl ether, propylene glycol phenyl ether, diphenylmethane, diisopropylnaphthalene, petroleum fractions such as Solvesso types (from Exxon) such as Solvesso 200, aromatic hydrocarbon resins, in particular phenol group-containing types, sebacates, phthalates, mineral oil fractions, naphtha, aromatic naphtha, organic phosphoric and sulfonic esters, and sulfonamides;

Polymers having functional groups, such as polyamides, polysulfides, polyvinyl formal (PVF), polyvinyl butyral (PVB), polyurethanes (PUR), polymers having carboxyl groups, polyamides, butadiene-acrylonitrile copolymers, styrene-acrylonitrile copolymers, butadiene-styrene copolymers, homo- or copolymers of unsaturated monomers, particularly from the group comprising ethylene, propylene, butylene, isobutylene, isoprene, vinyl acetate and alkyl (meth)acrylates, in particular chlorosulfonated polyethylenes and fluorine-containing polymers, sulfonamide-modified melamines and purified montan waxes;

organic or inorganic pigments and dyes;

accelerators, which accelerate the reaction between amino groups and epoxide groups, for example, acids or compounds hydrolyzable to form acids, for example organic carboxylic acids such as acetic acid, benzoic acid, salicylic acid, 2-nitrobenzoic acid, lactic acid, organic sulfonic acids such as methanesulfonic acid, p-toluenesulfonic acid or 4-dodecylbenzenesulfonic acid, sulfonic acid esters, other organic or inorganic acids such as phosphoric acid, or mixtures of the aforementioned acids and acid esters; furthermore tertiary amines such as 1,4-diazabicyclo[2.2.2]octane, benzyldimethylamine, α-methylbenzyldimethylamine, triethanolamine, dimethyl aminopropylamine, salts of such tertiary amines, quaternary ammonium salts such as benzyltrimethyl ammonium chloride, phenols, in particular bisphenols, phenolic resins and Mannich bases such as 2-(dimethylaminomethyl)-phenol and 2,4,6-tris-(dimethylaminomethyl)-phenol, phosphites such as di- and triphenyl phosphites, and mercapto group-containing compounds such as those already mentioned above; catalysts;

rheology modifiers such as in particular thickening agents, for example layer silicates such as bentonites, derivatives of castor oil, hydrogenated castor oil, polyamides, polyurethanes, urea compounds, fumed silicas, cellulose ethers and hydrophobicallymodified polyoxyethylenes;

adhesion promoters, for example, organoalkoxysilanes such as 3-glycidoxypropyl trimethoxysilane, 3-aminopropyl-trimethoxysilane, N-(2-aminoethyl)-3-aminopropyl-trimethoxysilane, N-(2-aminoethyl)-N'-[3-(trimethoxysilyl)-propyl]-ethylene diamine, 3-ureidopropyl trimethoxysilane, 3-chloropropyl trimethoxysilane, vinyl trimethoxysilane, or the corresponding organosilanes with ethoxy groups or (poly) etheroxy groups instead of the methoxy groups;

stabilizers against oxidation, heat, light and UV radiation;

flame retardants, in particular compounds such as aluminum hydroxide ($Al(OH)_3$; also referred to as ATH for "aluminum trihydrate"), magnesium hydroxide ($Mg(OH)_2$; also referred to as MDH for "magnesium dihydrate"), ammonium sulfate (($NH)_2SO_4$), boric acid ($B(OH)_3$, zinc borate, melamine borate and melamine cyanurate; phosphorus-containing compounds such as ammonium phosphate (($NH_4)_3PO_4$), ammonium polyphosphate, melamine phosphate, melamine pyrophosphate, triphenyl phosphate, diphenyl cresyl phosphate, tricresyl phosphate, triethyl phosphate, tris-(2-ethylhexyl) phosphate, trioctyl phosphate, mono-, bis- and tris-(isopropylphenyl) phosphate, resorcinol-bis-(diphenyl phosphate), resorcinol diphosphate oligomer, tetraphenyl-resorcinol diphosphate, ethylenediamine diphosphate and bisphenol A-bis-(diphenyl phosphate); halogen-containing compounds such as chloroalkyl phosphates, in particular tris-(chloroethyl) phosphate, tris-(chloropropyl) phosphate and tris-(dichloroisopropyl) phosphate, polybrominated diphenyl ethers, in particular decabromodiphenyl ether, polybrominated diphenyl oxide, tris-[3-bromo-2,2-bis-(bromomethyl)-propyl]phosphate, tetrabromo-bisphenol A, bis-(2,3-dibromopropyl ether) of bisphenol A, brominated epoxy resins, ethylene-bis-(tetrabromophthalimide), ethylene-bis-(dibromonorbornane-dicarboximide), 1,2-bis-(tribromophenoxy) ethane, tris-(2,3-dibromopropyl) isocyanurate, tribromophenol, hexabromocyclododecane, bis-(hexachlorocyclopentadieno) cyclooctane and chlorinated paraffins;

surfactants such as wetting agents, leveling agents, deaerating agents or defoamers. Suitable anti-foams or defoamers are preferably compounds based on mineral oils or silicones;

additional fillers such as organic fillers such as organic polymers, e.g., as a powder or hollow beads such as PVC powder or hollow PVC-beads; plastic fibers or natural fibers, or carbon black, graphite, titanates, metal powders such as aluminum, copper, iron, silver or steel;

biocides such as algicides, fungicides or fungal growth inhibitors;

further dispersing agents and liquefiers different from polycarboxylate ethers such as surfactants, phosphate esters with long-chain polyether components, lignin sulfonates, melamine-formaldehyde sulfonates or naphthalene-formaldehyde sulfonates. The uniform distribution of the fillers in the epoxy composition can be improved in individual cases if other dispersing agents are included.

The invention also relates to a cured epoxy resin, that is, a cured plastic material, obtainable by curing an epoxy composition according to the invention or by mixing the components and curing a multi-component system according to the invention. The term "epoxy resin" as used herein, in accordance with the common parlance, refers to the cured composition, in which the other ingredients, such as fillers, are integrated. The epoxy resin is cured if no substantial further reaction takes place between the epoxide groups and the curing agent. The cured epoxy resin having a solid consistency may be, for example, a three-dimensional object or component, a coating, a bonding bridge, a putty, a constituent of a laminate, an adhesive, a filling or sealant. Preferably, the filler is uniformly or substantially uniformly distributed in the cured resin.

The cured epoxy resin is structurally different from known epoxy resins and has advantageous properties, in particular for underwater grouting. It has a very good flowability and excellent underwater curing behavior, adhesion properties, and mechanical properties after curing. The flow spread or flowability can be determined as described in the exemplary embodiments and/or in in accordance with DIN EN 13395-1 or DIN EN 1015-3.

Another aspect of the invention is a method for repairing or reinforcing a pile or column, comprising the steps
  a) Optionally pretreating the pile or column by cleaning, sand- or wet blasting, priming, and/or brushing;
  b) Installing a sleeve around the pile or column covering the damaged areas of the pile or column surface such that the sleeve circumvents the pile or column leaving a gap between the surface of the pile or column and the inner surface of the sleeve;
  c) Sealing the sleeve against the pile or column, in particular at the lower opening;
  d) Introducing the curable epoxy-resin composition according to at least one of claims 1 to 8, or the epoxy-resin composition obtained by mixing a multi- or two-component system according to at least one of claims 9 to 11 in the appropriate ratio into the gap between the sleeve and the pile or column;
  e) Curing the epoxy-resin composition.

In preferred embodiments of this method, said pile or column is at least partially submerged in water.

In preferred embodiments of this method, said pile or column is made of concrete and/or steel.

The method, apart from the curable epoxy resin composition according to the invention, is known in the field of refurbishment. This method is known since the 1970s and widely used. For example, Chinese utility model CN 205205695 U or Chinese patent application CN 105862574 A teach this method in a recent approach. The curable epoxy resin composition according to the present invention allows a significant improvement of this method, especially for piles or columns at least partially submerged in water. The resulting cured composition exhibits significantly improved mechanical and adhesion properties, is easy to handle, and shows excellent underwater application and curing behavior.

EXEMPLARY EMBODIMENTS

The following examples illustrate some embodiments of the invention. The term "norm climate" refers to a temperature of 23° C. and a relative humidity ("r.h.") of 50%.

Test Methods

Flowability of the epoxy compositions was determined in accordance with Chinese Standard JC/T 986-2005. All the individual components of the composition to be tested were pre-conditioned at norm climate (23° C., 50% r.h.) for at least 8 hours. All the components were mixed together for at least 3 minutes with a mixing spindle attached to a slow speed electric drill (max. 400 rpm) until the material became smooth in consistency and had a uniform color. A bottomless cone (height: 60 mm±0.5 mm; top inner diameter: 70 mm±0.5 mm; bottom inner diameter: 100 mm±0.5 mm) was put vertically on a glass plate and filled to the brim with mixed composition. Using a stopwatch, time recording was started, the test mould was lifted 5-10 cm and held in place for at least 15-20 seconds to let the composition drip off completely. The composition began to spread in all directions on the glass plate. After 30 minutes, the diameters of the flow spread was measured in two directions at right angles to one another. The recorded result (flowability) is the average of those diameters in mm.

Compressive strength was measured in accordance with EN 196 standard using cured (1 d or 7 d norm climate ("air") and 1 d or 7 d underwater ("underwater"), 23° C.) epoxy-based composition prismatic test specimens (40×40×160 mm) and a rate of load increase of 2400±200 N/s.

Flexural strength was measured in accordance with EN 196 standard using cured (1 d or 7 d norm climate ("air") and 1 d or 7 d underwater ("underwater"), 23° C.) epoxy-based composition prismatic test specimens (40×40×160 mm) and a rate of loading of 50±10 N/s.

Density (specific gravity) was determined in accordance with EN ISO 2811-1:2001 standard using a pre-conditioned 100 mL metal pycnometer at a temperature of 20° C.

Adhesion on concrete (bonding strength by pull-off adhesion test) was determined in accordance with EN 1542 standard by direct pull-off using a steel dolly bonded to the surface of the cured composition. The dimension of the concrete/substrate specimen was 300×300×100 mm. The surface was sandblasted according to EN 1766. Samples labelled "curing in air" were cured during 7 days under norm climate using dry concrete substrates. Samples labelled "curing underwater" were cured during 7 days underwater (23° C.) using wet concrete substrates that had been immersed in water at least 24 h prior to the application of the epoxy-based composition. For the pull-off experiment, a load was continuously and evenly increased at a rate of 0.05±MPa/s for each test assembly.

Underwater behavior of uncured or curing samples of the epoxy-based compositions were assessed by optical inspection. In each experiment, 150 mL of clean water were filled into a 200 mL transparent plastic cup. After this, 100-150 g of the freshly mixed sample composition were poured into the water in the cup. Normally, the composition sank to the ground and remained there. The water phase was checked by eye for floating particles and the formed epoxy-based grout layer was checked for appearance. A "good" result requires the water to be clear and free of floating particles, coloration, or turbidity (dispersion effects). At the same time, a "good" result requires the epoxy grout layer to be homogeneous, compact, and free of cracks. Any deviation from this ideal behavior was noted in the results of the assessment.

Example Compositions

Preliminary Study: Influence of Filler and Polycarboxylate Ether

A series of experimental two-component compositions were prepared in order to study the influence of filler and polycarboxylate ether. In all those experiments, component K2 (hardener component) was identical.

Component K1: Epoxy Resin

TABLE 1

Basic formulation of component K1.

| Ingredient | wt.-% (based on total K1) |
|---|---|
| Bisphenol A-epichlorohydrin resin (Dow D.E.R ® 331) | 24 |

TABLE 1-continued

Basic formulation of component K1.

| Ingredient | wt.-% (based on total K1) |
|---|---|
| C12/C14-alkyl glycidyl ether (reactive diluent) | 2.5 |
| Portland cement (hydraulic binder) | 7.5 |
| Defoamer | 0.03 |
| Pigment | 4 |
| Filler [1] | 61 |
| Solvent naphtha [3] | 0.9-0.97 |
| Polycarboxylate ether (PCE) [2] | 0-0.07 |
| Total | 100 |

[1] Filler type is specified in each experiment individually and detailed in Table 2.

[2] Polycarboxylate ether is a comb polymer comprising structural units (i) of the formula II and structural units (ii) of the formula III, wherein $R^1$ represents —COOM; $R^2$, $R^4$, $R^5$, $R^3$, $R^6$ and $R^7$ represent H; M, independently of one another, represents $H^+$, an alkali metal ion, or an alkaline earth metal ion; m = 0; p = 1; X represents —O—; $R^8$ represents a group of formula -[AO]$_n$—$R^a$, wherein A = $C_2$-alkylene, $R^a$ represents $CH_3$, and n = 22 to 72.

[3] Amount of solvent naphtha was used to adjust the composition to 100 wt.-%, depending on the amount of PCE used.

TABLE 2

Type of filler and amount of polycarboxylate ether (PCE) used in the individual components K1.

| Example | Filler | Amount PCE (wt.-%) |
|---|---|---|
| K1-1 | BaSO4 (particle size D50 = 10-15 μm) | 0 |
| K1-2 | BaSO4 (particle size D50 = 1.3 μm) | 0 |
| K1-3 | BaSO4 (particle size D50 = 2.3 μm) | 0 |
| K1-4 | Silica (particle size D50 = 20 μm) | 0 |
| K1-5* | Silica (particle size D50 = 20 μm) | 0.02 |
| K1-6 | Silica (particle size D50 = 20 μm) | 0.05 |
| K1-7 | Silica (particle size D50 = 20 μm) | 0.07 |

*K1 according to invention. All others are reference examples.

The epoxy resin was charged first. All other materials were added and homogenized for about 5 minutes.

Component K2: Hardener

TABLE 3

Basic formulation of component K2.

| Ingredient | wt.-% (based on total K2) |
|---|---|
| Benzyl alcohol | 34 |
| Cycloaliphatic polyamine | 19 |
| Aliphatic polyamine | 15.5 |
| Accelerator | 7.8 |
| Liquid petroleum resin | 18.7 |
| Polyamidoamine | 5 |
| Total | 100 |

In order to obtain curable example compositions, each individual component K1 in Table 2 was mixed with component K2 of Table 3 in a weight ratio K1:K2 of 8:1.

Results of Preliminary Study

TABLE 4

Preliminary test results.

| Example | Flowability [mm] | Compressive strength [MPa] (underwater) 7 d | Underwater behavior |
|---|---|---|---|
| K1-1/K2 | n/m | 66.82 | Serious dispersion in water, filler particles came out |
| K1-2/K2 | n/m | n/m | Severe cracks in composition and turbidity in water |
| K1-3/K2 | n/m | n/m | Severe cracks in composition and turbidity in water |
| K1-4/K2 | 306 | 87.4 | Good |
| K1-5/K2* | 418 | 90.5 | Good |
| K1-6/K2 | 450 | n/m | Turbidity and particles in water |
| K1-7/K2 | 470 | n/m | Turbidity and particles in water |

*Experiment according to the invention, "n/m" means this value was not measured.

Table 4 shows that only the experiment according to the present invention shows good underwater behavior combined with high flowability and good compressive strength after underwater curing.

Benchmark Test of Selected Epoxy-Based Grouts for Underwater Curing

TABLE 5

Benchmark test results.

| Test method | Sikadur ®-53 (Sika Switzerland) [1] | Simpson FX-70 ®-6 (Simpson Strong-Tie USA) [2] | K1-5/K2 (weight ratio 8:1) (see Tables 1 to 3) |
|---|---|---|---|
| Density [g/cm³] | 2 | 1.84 | 1.74 |
| Flowability [mm] | 360 | 374 | 418 |
| Compressive strength [MPa] (1 d/7 d air) | 64.2/88.2 | 34/59.2 | 84.1/104.3 |
| Compressive strength [MPa] (1 d/7 d underwater) | 53.6/80.3 | 29.1/8.2 | 70.9/90.5 |
| Flexural strength [MPa] (1 d/7 d air) | n/m/51.6 | n/m/42.8 | 56.6/57 |
| Flexural strength [MPa] (1 d/7 d underwater) | n/m/n/m | n/m/n/m | 41.3/45.5 |
| Adhesion on concrete (air) [MPa] | n/m | 2.4 | 5.17 |
| Adhesion on concrete (underwater) [MPa] | 2.97 | n/m | 4.89 |

"n/m" means this value was not measured.
[1] Commercial two-component epoxy-based grout for underwater curing. Contains approx. 55 wt.-% BaSO₄ based on the total composition.
[2] Commercial three-component epoxy-based grout for underwater curing. Contains ca. 50 wt.-% silica, ca. 15 wt.-% fly ash, and ca. 8 wt.-% BaSO₄ based on the total composition. Does not contain polycarboxylate ether.

The data in Table 5 shows that the composition according to the present invention has improved handling properties (flowability) and, surprisingly, also improved mechanical properties as well as curing behavior in air and underwater.

The invention claimed is:

1. A method for repairing or reinforcing a pile or column, comprising
   a) optionally pretreating the pile or column by cleaning, sand-blasting, wet blasting, priming, and/or brushing;
   b) installing a sleeve around the pile or column covering damaged areas of the pile or column surface such that the sleeve circumscribes the pile or column leaving a gap between the surface of the pile or column and an inner surface of the sleeve;
   c) sealing the sleeve against the pile or column;
   d) introducing into the gap between the sleeve and the pile or column a curable epoxy resin composition for underwater grouting that is either
      (a) a composition containing at least one epoxy resin having on average more than one epoxide group per molecule, at least one inorganic filler, at least one hydraulic binder, and at least one polycarboxylate ether,
      wherein
         the inorganic filler comprises silica with an amount of between 45 and 65 wt. %, based on the total curable epoxy resin composition, and
         the amount of the polycarboxylate ether is between 0.01 and 0.03 wt. %, based on the total curable epoxy resin composition; or
      (b) a composition obtained by mixing a multi- or two-component system comprising a component K1 containing the at least one epoxy resin, and a curing agent component K2 containing at least one curing agent, wherein the at least one inorganic filler, the at least one hydraulic binder, and the at least one polycarboxylate ether are contained in the component K1, in the component K2, or in an additional component K3; and
   e) curing the curable epoxy resin composition.

2. The method according to claim 1, wherein the pile or column is at least partially submerged in water.

3. The method according to claim 1, wherein the pile or column is made of concrete and/or steel.

4. The method according to claim 1, wherein the sealing the sleeve against the pile or column seals one end opening between the surface of the pile or column and the inner surface of the sleeve.

5. The method according to claim 1, wherein the curable epoxy resin composition is a two-component system comprising the component K1 containing the at least one epoxy resin, the at least one inorganic filler, the at least one hydraulic binder, and the at least one polycarboxylate ether, and the curing agent component K2 containing the at least one curing agent.

6. The method according to claim 5, wherein
   the component K1 comprises
      between 15 and 35 wt. %, based on the total component K1, of the at least one epoxy resin;
      between 0 and 5 wt. %, based on the total component K1, of an epoxy-functional diluent;
      between 0 and 0.1 wt. %, based on the total component K1, of a defoamer;
      between 5 and 10 wt. %, based on the total component K1, of the at least one hydraulic binder;
      between 50 and 70 wt. %, based on the total component K1, of the at least one inorganic filler;
      between 0.015 and 0.025 wt. %, based on the total component K1, of the at least one polycarboxylate ether; and
   the component K2 comprises
      between 20 and 60 wt. %, based on the total component K2, of at least one polyamine curing agent;
      between 0 and 15 wt. %, based on the total component K2, of an accelerator;
      between 0 and 50 wt. %, based on the total component K2, of solvents;
   wherein all amounts of the individual ingredients in each component K1 and K2 are adjusted such that the sum of all individual amounts does not exceed 100% in the respective component K1 or K2.

7. The method according to claim 1, wherein the silica has a particle size of <50 μm, determined by sieve analysis according to ASTM E11 using a No. 325 Mesh.

8. The method according to claim 1, wherein the hydraulic binder is cement and comprised in the composition with an amount of between 5 and 10 wt.-%, based on the total curable epoxy resin composition.

9. The method according to claim 1, wherein the curable epoxy resin composition additionally contains at least one curing agent and/or at least one reactive diluent.

10. The method according to claim 1, wherein the epoxy resin comprises at least one glycidyl ether, and/or the curing agent contains at least one polyamine, which is selected from the group consisting of aliphatic, cycloaliphatic or arylaliphatic primary diamines, triamines, tetramines, polyamines with more than four amine groups per molecule, secondary amine group-containing polyamines, amine/polyepoxide adducts, poly(ethylene imines), polyamidoamines, Mannich bases and amino-terminated butadiene/acrylonitrile copolymers.

11. The method according to claim 1, wherein the polycarboxylate ether has side chains linked to a main chain via ester, amide and/or ether groups, wherein the main chain has at least one acrylic acid moiety or a salt thereof and/or at least one methacrylic acid moiety or a salt thereof.

12. The method according to claim 1, wherein the polycarboxylate ether is a comb polymer comprising structural units (i) of the formula II and structural units (ii) of the formula III,

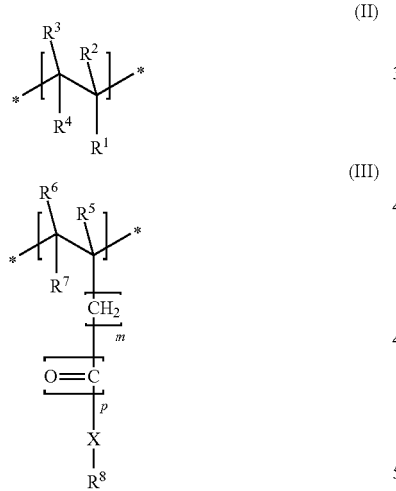

wherein $R^1$, independently of one another, represents —COOM, —SO$_2$—OM, —O—PO(OM)$_2$, and/or —PO(OM)$_2$, $R^2$ und $R^5$, independently of one another, represent H, —CH$_2$COOM, or an alkyl radical with 1 to 5 carbon atoms, $R^3$ und $R^6$, independently of one another, represent H or an alkyl radical with 1 to 5 carbon atoms, $R^4$ und $R^7$, independently of one another, represent H, —COOM, or an alkyl radical with 1 to 5 carbon atoms, or wherein $R^1$ together with $R^4$ forms a —CO—O—CO— ring (anhydride), M, independently of one another, represents H$^+$, an alkali metal ion, an alkaline earth metal ion, an ammonium cation, an organic ammonium compound, a di- or trivalent metal cation, or mixtures thereof;

m=0, 1, or 2, p=0 or 1,

X, independently of one another, represents —O—, NH—, or —NR$^8$—, $R^8$, independently of one another, represents a radical of the formula -[AO]$_n$—R$^a$, wherein A=C$_2$- to C$_4$-alkylene, R$^a$ represents H, a C$_1$- to C$_{20}$-alkyl group, -cyclohexyl group, or -alkylaryl group, and n=2 to 250.

13. The method according to claim 12, wherein $R^1$ represents -COOM, $R^2$, $R^1$, $R^5$, $R^3$, $R^6$ and $R^7$ represent H, M, independently of one another, represents H+, an alkali metal ion, or an alkaline earth metal ion;

m=0, p=1, X represents —O—, $R^8$ represents a group of formula -[AO]$_n$—R$^a$, wherein A=C$_2$-alkylene, in particular C$_2$ alkylene, R$^a$ represents CH$_3$, and n=22 to 72.

14. The method according to claim 12, where n=10 to 200.

* * * * *